United States Patent [19]

Fowler

[11] Patent Number: 4,496,431
[45] Date of Patent: Jan. 29, 1985

[54] CENTRIFUGAL EVAPORATION APPARATUS

[76] Inventor: Leslie L. Fowler, 1722 E. 59th St., Tulsa, Okla. 74105

[21] Appl. No.: 410,586

[22] Filed: Aug. 23, 1982

[51] Int. Cl.$^3$ .............. B01D 1/24; B01D 3/00
[52] U.S. Cl. ................... 202/83; 202/176; 202/202; 202/233; 202/234; 202/235; 159/6.1; 159/16 S; 203/100
[58] Field of Search ............ 159/6.1, 29, 16 S, 22, 159/23; 203/94, 95, DIG. 4, 14, 100, 92, DIG. 25; 202/106, 118, 205, 83, 233, 234, 235, 176; 210/167, DIG. 5, 320, 3 M

[56] References Cited

U.S. PATENT DOCUMENTS

| | | | |
|---|---|---|---|
| 2,406,581 | 8/1946 | Bergstrom et al. | 159/16 S |
| 3,084,107 | 4/1963 | McMahon | 159/16 S |
| 3,122,528 | 2/1964 | Hanesworth | 159/16 S |
| 3,257,374 | 6/1966 | Bell et al. | 159/16 S |
| 3,456,798 | 7/1969 | Urdanoff | 210/167 |
| 3,950,230 | 4/1976 | Greenfield et al. | 159/16 S |
| 3,957,588 | 5/1976 | Humiston | 203/84 |
| 4,081,371 | 3/1978 | Rozniecki | 210/DIG. 5 |
| 4,157,281 | 6/1979 | Burkhardt et al. | 159/16 S |
| 4,219,380 | 8/1980 | Muschelknautz et al. | 159/6.1 |
| 4,333,835 | 6/1982 | Lynch | 210/320 |
| 4,343,683 | 8/1982 | Diggs | 202/234 |
| 4,344,825 | 8/1982 | Colwell | 202/173 |

FOREIGN PATENT DOCUMENTS

| 470419 | 8/1937 | United Kingdom | 134/12 |
|---|---|---|---|
| 768422 | 11/1980 | U.S.S.R. | 210/167 |

Primary Examiner—Wilbur Bascomb
Assistant Examiner—Virginia Manoharan
Attorney, Agent, or Firm—Head, Johnson & Stevenson

[57] ABSTRACT

A method of centrifugal evaporation such as may be employed for reclaiming used industrial solvent having water and solid contaminants, including injecting the contaminated solvent into a cyclonic still, heating the contaminated solvent in the still to vaporize the solvent and water content, the solid contaminant being separated and discharged as a wet sludge, conducting the co-mingled solvent and water vapors to a condenser in which the vapors are condensed to liquids, separating the condensed liquids into solvent for reuse and water for disposal, passing the wet sludge into an inclined elongated dryer where the sludge is heated, vaporizing the liquid which is drawn off, the dried solid contaminant being collected for reuse or disposal.

11 Claims, 3 Drawing Figures

CENTRIFUGAL EVAPORATION APPARATUS

BRIEF SUMMARY OF THE INVENTION

A method and apparatus is provided for centrifugal evaporation particularly useful as a portable means for separating a desirable liquid from a liquid contaminated with water and solids.

The apparatus which may be employed in practicing the methods of this invention includes a heated cyclonic still. The still has an upper portion which functions to evaporate liquids from solid contaminant input products, and a lower cyclonic separator portion. The contaminated product, such as used solvent, is injected into the still tangentially of the cylindrical wall thereof to impart a whirling or cyclonic action to the liquid within the still. In a preferred arrangement the cyclonic action is augmented by centrifugal boosters into which steam is injected. This cyclonic action in the lower portion of the still increases the surface area exposure of the liquid within the still and produces agitation to speed the evaporation of the liquid components of the contaminated solvent. The liquid component passes out of the still in the form of a vapor, the vapor being co-mingled water vapor and solvent. The solid component which is accumulated as a result of the evaporization within the still passes out of the bottom of the still as a wet sludge and into the inlet of an inclined elongated heated closed conveyor-dryer. Within the conveyor-dryer the wet sludge is slowly advanced upwardly while exposed to sufficient heat to drive off the fluid content and produce a solid waste. The vapors produced in the conveyor-dryer are drawn off and in the preferred arrangement are combined with the vapors from the still. The solid contaminant product, which has market value, is conducted through an outlet opening adjacent the top of the conveyor-dryer and passes downwardly through a valve into a dry sludge receptable, such as a barrel.

The vapors drawn from the still and the conveyor-dryer are passed into a condenser where they are converted to liquid. The liquid which is co-mingled water and solvent is conducted to a separator wherein the components are separated. In the preferred arrangement the separator includes a coalescer to augment the separation processs. Out of the separator water is delivered for disposal and the reclaimed solvent is conducted for storage and reuse.

Heat for operation of the still and conveyor-dryer is preferably supplied by means of heat transfer fluid which is conducted to jackets surrounding these devices. The heat transfer fluid is heated in a heater-vaporizer which may be fired by gas or electricity. The vaporizer in addition preferably includes a steam generator as an integral part thereof to produce the steam for use in augmenting the cyclonic action within the still.

In the preferred method of operation a buffer chemical, such as sodium hydroxide, is injected into the still to mix with the contaminated solvent and, in addition, it is prefered that an abrasive, such as diatomaceous earth, be injected into the still. The abrasive material serves to clean the interior of the still and augments the separation of the solid contaminants.

DETAILED DESCRIPTION

Figure 1:
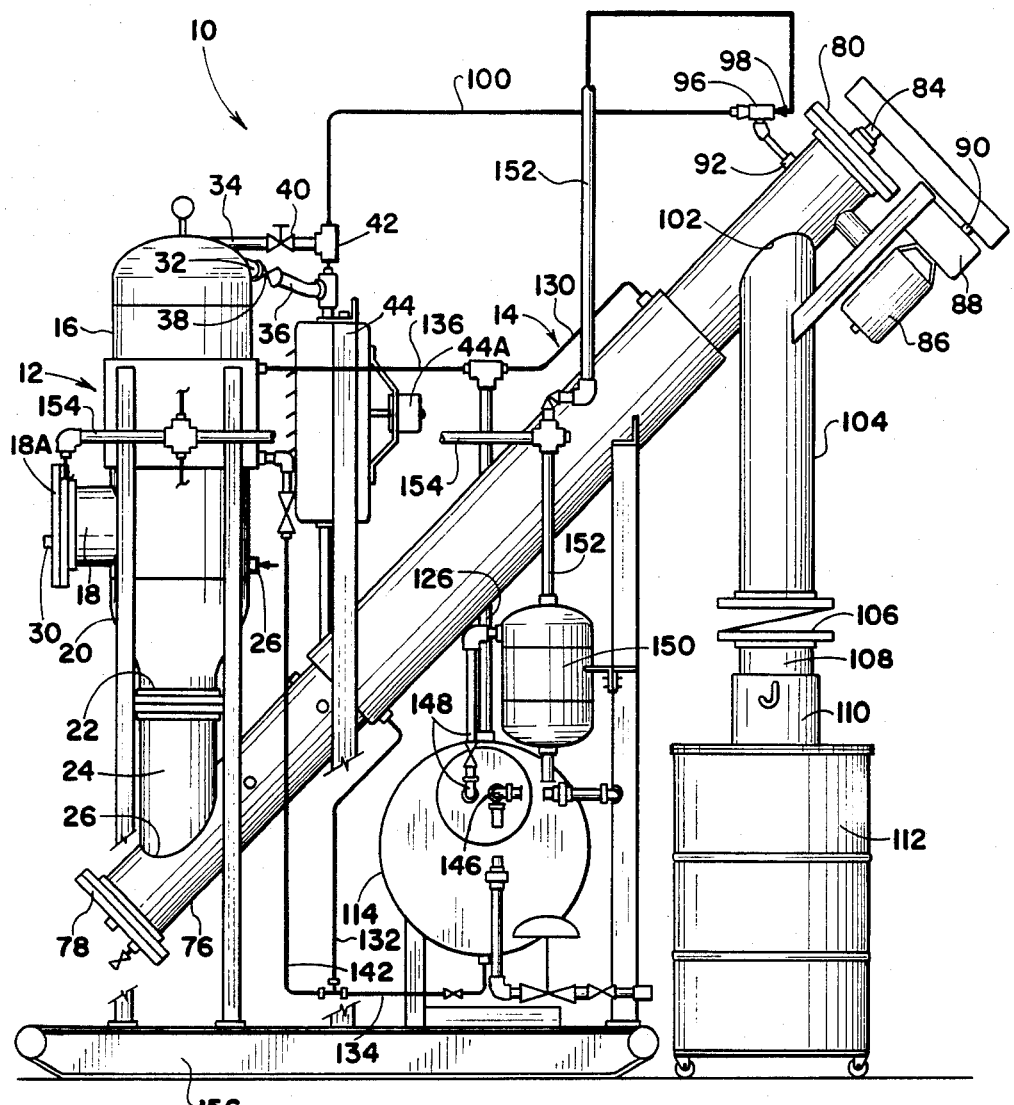
FIG. 1 is a side view of a skid mounted unitary centrifugal evaporation apparatus according to the invention which illustrates one means for practicing the methods of the invention.

Referring to the drawings, the basic components making up the apparatus and for use in practicing the methods of this invention are mounted in a skid arrangement to provide a unitary portable plant generally indicated by the numeral 10. A cyclonic still is indicated by the numeral 12 and a conveyor-dryer by the numeral 14. The cyclonic still has an upper portion 16 which is a cylindrical closed top vessel. The vessel 16 has a clean-out opening 18 in the intermediate portion and includes a cyclonic separator portion 20 at the lower end. The bottom of the cyclonic separator portion terminates in an opening 22 which connects by way of a large diameter cylindrical conduit 24 to the inlet 26 of the conveyor-dryer 14.

The invention may be employed to reclaim a variety of contaminated evaporable liquid, but is particularly applicable to reclaim used solvent which commonly results from industrial applications to remove paint, grease, dirt, and other materials from parts during manufacturing operations. As the solvent enters still 26, it produces a whirling or cyclonic motion within the vessel so that it tends to adhere to the walls of the vessel. To augment or boost the cyclonic action of the contaminated solvent within the cyclone separator portion 20 of the still 12, steam is injected through steam inlet nozzles 28A through 28D (see FIG. 3). Nozzles 28A and 28B are connected internally by means of a conduit extending to a steam inlet 30.

The solvent and contaminant water components are evaporated within the cyclonic still 12, and the vapors therefrom pass out openings in the top. In the illustrated arrangement of FIG. 1, two openings are provided indicated by the numerals 32 and 34. Opening 32 is an atmospheric opening, the opening being connected to conduit 36 having a valve 38 therein. The opening 34 is a sub-atmospheric opening and includes in the piping connected to it a valve 40. Connected in series with the valve 40 is an eductor 42. Steam passing through eductor 42 generates a sub-atmospheric pressure which is applied when valve 40 is open to the opening 34. When the sub-atmospheric opening 34 is employed, valve 38 is closed, and valve 40 open. When the atmospheric opening 32 is employed, valve 38 is open and valve 40 closed. The vapors passing from within the cyclonic still 12, either through opening 32 or 34, are conveyed to the inlet of a condenser 44. While the condenser may be of a variety of configurations, an air-cooled condenser is illustrated which employs a fan (not seen) driven by a motor 44A. In the condenser 44 the vapors passing from the still are condensed into liquids. These liquids will be constituted essentially of water and solvent co-mingled. As shown in FIG. 2, the liquid outlet from the condenser 44 passes to an outlet conduit 46 into the inlet 48 of a separator 50.

Within the interior of the separator is a vertical partition 52 dividing the interior of the vessel 50 into an area 54A and 54B. The inlet 48 of the condenser is connected to a coalescing cartridge 56. A water outlet pipe 58 extends within the separator 50 and terminates adjacent the bottom. A short baffle 60 extends across the bottom of the interior of the separator and is between the water pipe 58 and coalescing cartridge 56. Water 62 which is separated is drawn out of the interior of the separator through conduit 58 which connects to piping 64 which, in turn, connects to hose 66 so that the water may be conveyed either to a sewer connection for disposition or to a drum for storage of the water for subsequent disposal.

Solvent 68 collected within the interior portion 54A of the separator flows over the top of baffle 52 and into the portion 54B where it flows out of the vessel through outlet piping 70 and thence to hose 72 so it can be conveyed to a drum. The solvent passing through hose 72 is cleaned of water and solid contaminant and is therefore available for reuse.

Figure 2:
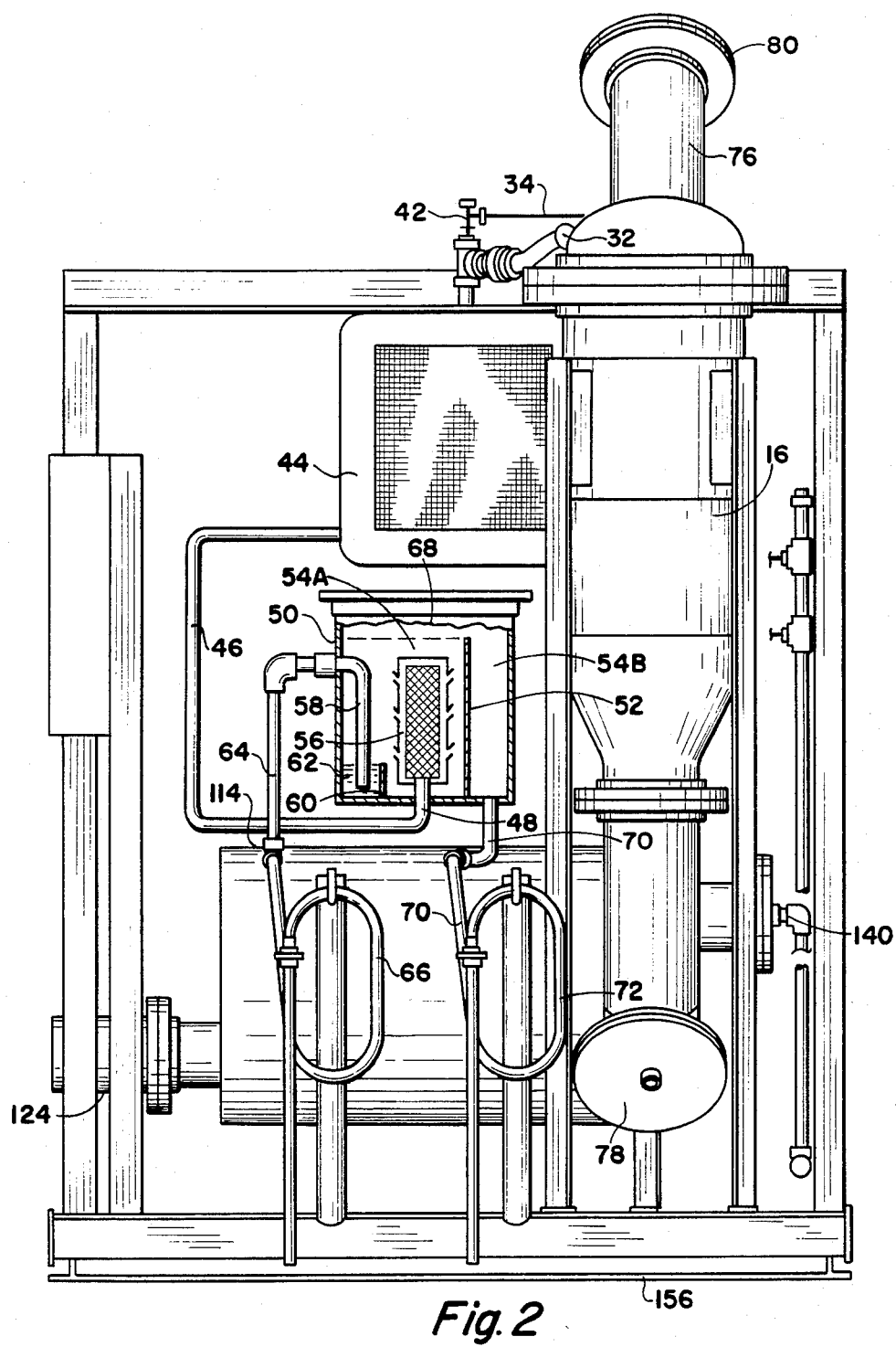
FIG. 2 is an elevational view of one end of the skid-mounted apparatus of FIG. 1.
Figure 3:
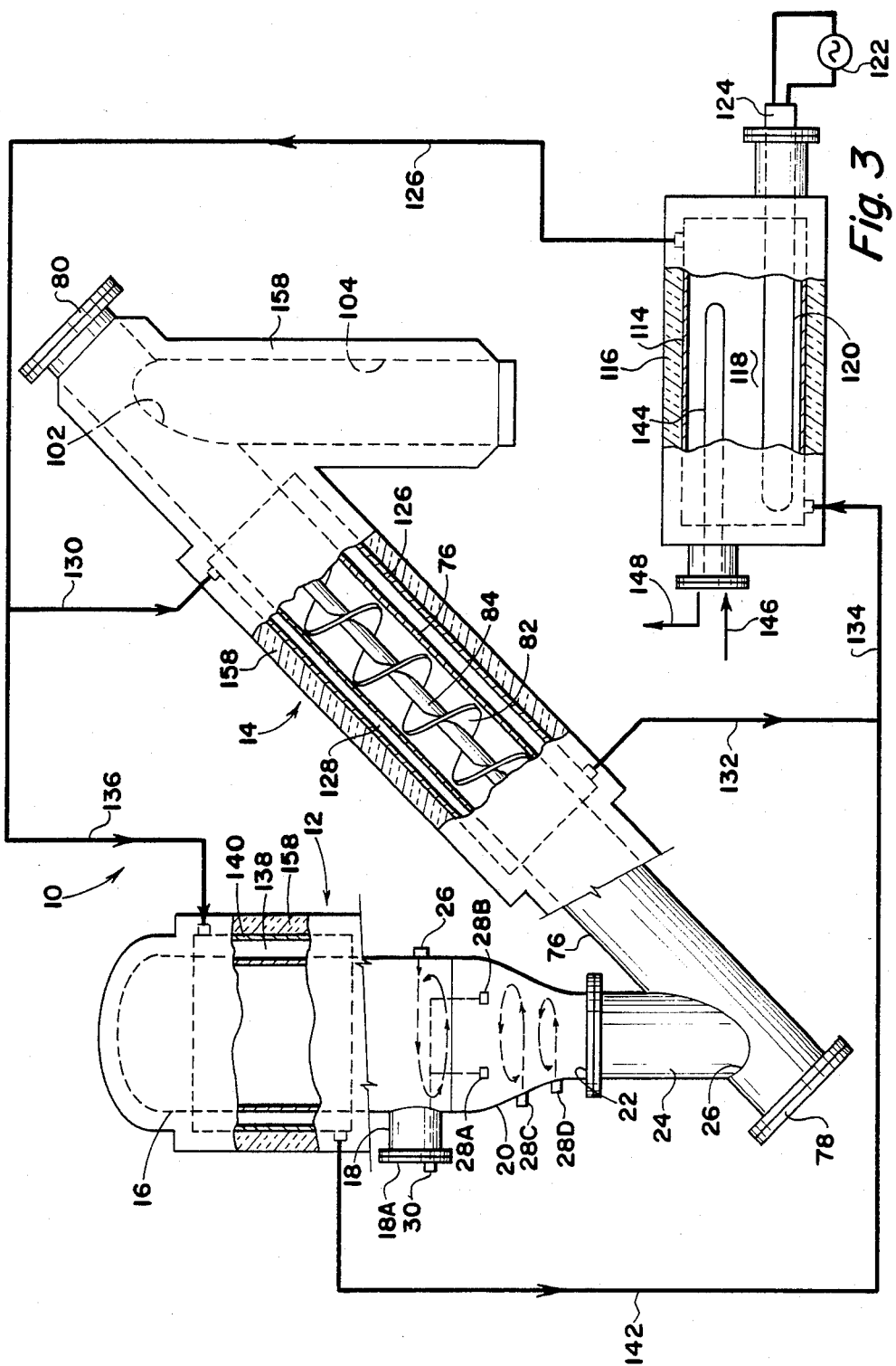
FIG. 3 is a schematic showing some of the details of the interior arrangement of the cyclonic still, the converter-dryer, and the heater-vaporizer and showing the flow arrangement for utilizing heat transfer fluid for providing the heat employed with the cyclonic still and the conveyor-dryer.

Referring to FIGS. 1 and 3, the solid contaminant which passes out through the lower opening 22 of the cyclonic still through cylindrical conduit 24 and inlet opening 26 into the lower end of the inclined 14 is in the form of a wet sludge. The conveyor-dryer includes an elongated upwardly inclined cylindrical housing 76 closed by a lower plate 78 and an upper plate 80. Within the housing 76 is a screw conveyor or auger 82. As seen in FIG. 1, the screw conveyor shaft 84 extends sealably through the upper plate 80 and is driven by gears, belts, chains, or otherwise, by means of an electric motor 86. Rotative energy from motor 86 is passed to a reduction gearbox 88 and to an output shaft 90. The rotation of shaft 90 then rotates the screw conveyor shaft 84. The screw conveyor preferably is turned at a low speed such as about three-quarters of a revolution per minute.

The wet sludge is conducted upwardly within the cylindrical housing 76. The inclined upward travel allows liquid to drain from the sludge downwardly, and at the same time the sludge is heated so that the liquid content is driven off. The vapors resulting from the evaporation of the liquid content pass out of the housing 76 through a vapor outlet 92 (see FIG. 1). Connected to the vapor outlet 92 is the input of an eductor 96 which receives steam at a steam input 98. The output of the eductor 98 is connected to piping 100 which leads into the input of eductor 42 and therefrom, as previously described, into the condenser 44.

As the wet sludge is carried upwardly by the screw conveyor 82, it is heated and the liquid component driven off as previously described. The sludge becomes a dry powder which is moved by the auger to the conveyor-dryer outlet opening 102. Here the powder is discharged downwardly through a vertical chamber 104. As seen in FIG. 1, a butterfly type valve 106 closes the end of chamber 104. Attached to the bottom end of the butterfly valve is a conduit 108 which telescopically receives a sliding fitting 110 which includes the top closure of a drum 112. During operation, the valve 106 is normally open so that the dry residue passes downwardly into drum 112. When the drum is filled the valve 106 is closed. The process can continue to operate since the residue will be deposited on top of the closed valve. The sliding fitting 110 may then be slid upwardly, allowing drum 112 to be removed and replaced by a new drum. When the new drum is in position the valve 106 is opened so that the material deposited on top of the closed valve is dumped into the barrel and the process continued until another barrel is required. In this way, the entire solid handling system is closed and never exposed to the atmosphere. In addition, by the application of sub-atmospheric pressure to the interior of the conveyor-dryer as is achieved by the use of the eductor 96, the possibility of escape of vapors or dry solid powder to the atmosphere is eliminated.

The heat required for the cyclonic still 12 and conveyor-dryer 14 can be supplied in a variety of ways, but a preferred embodiment is illustrated which utilizes a heater-vaporizer 114. The heater-vaporizer is shown in cross-sectional view in FIG. 3 and includes a closed vessel having insulation 116 around it. Within the interior of the vessel is a heat transfer fluid 118 such as exemplified by a product manufactured by Dow Chemical Company under the trademark "DOWTHERM". An electric heating element 120 is within the heater-vaporizer to heat the heat transfer liquid. A voltage source 122 is connected to the heating element 120 through an explosion-proof fitting 124 to reduce the possibility of an explosive in the event of the leakage of solvent liquid or vapors. The heat transfer fluid 118 flows out of the heater-vaporizer 114 through conduit 126. Surrounding the housing 76 of the conveyor-dryer is a jacket 126 providing an annular area 128 around the housing. The heat transfer fluid flows through conduit 130 into the annular area 128 to heat the interior of the conveyor-dryer. The heat transfer fluid flows out of the annular area 128 through conduits 132 and 134 back into the heater-vaporizer.

In like manner, by conduit 136 the heat transfer fluid is conducted to an annular area 138 provided by a jacket 140 surrounding the still upper portion 16. Heat transfer fluid thereby heats the still and flows out through conduit 142 back to the heater-vaporizer. In the arrangement illustrated in FIG. 3 the flow is by gravity, the heated fluid rising and the cooler fluid falling; however, it can be seen that if desirable a pump can be used to increase the flow rate of the heat transfer fluid.

In order to provide the steam as employed in the process, as shown in FIG. 3, a U-shaped tube 144 is positioned within the interior of the heater-vaporizer. Water is injected through input 146. The water is heated in the tube 114 generating steam at steam outlet 148. Steam outlet 148 connects to a water knockout 150 as shown in FIG. 1 wherein excess water is removed from the steam, producing drier steam which passes out of the water knockout through conduit 152. The steam is carried by conduit 152 to the steam inlet opening 98 of the eductor 96. In addition, by piping 154, shown only partially in FIG. 1 and not shown in FIG. 3, steam is conducted to the steam inlet openings 30, 28C, and 28D to augment the cyclonic action in the still as previously described. In this unique arrangement all of the heat necessary for the unit is supplied by the single heating element 120 within the heater-vaporizer 114.

An important feature of this invention is that it can be integrally packaged in a very compact arrangement as illustrated in FIGS. 1 and 2. The complete solvent reclaiming unit is mounted on skids 156. The plant may then be easily moved from one location to another where cleaning of a fluid, such as solvent, is required.

The invention provides a unique arrangement of an integral device consisting of the cyclonic still 112 and conveyor/dryer 114 which succeeds in providing the basic steps for extracting water and solid contaminants from a vaporizable liquid such as solvent. To conserve energy, insulation 158 is placed around portions of the cyclonic still and the conveyor-dryer.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A centrifugal evaporation system for use in reclaiming used industrial solvent having water and solid contaminant therein, comprising:

a heated cyclonic still into which the contaminated solvent is injected in a manner to cause the contaminated solvent to move cyclonically within the still, the still having a bottom discharge opening, a vapor outlet, and a contaminated solvent inlet;

an inclined elongated heated closed conveyor-dryer having an inlet opening adjacent the lower end positioned under and connected directly to said still bottom discharge opening, the still serving to vaporize the solvent and water content of the contaminated sovent, the solid contaminant passing out said bottom discharge opening of said still as a wet sludge, the slude being drained of liquid and dried as it is upwardly conveyed in the conveyor-dryer, the closed conveyor-dryer having a vapor outlet and a solids discharge outlet adjacent its upper end;

a condenser having a vapor inlet and a liquid outlet;

conduit means connecting said cyclonic still vapor outlet and said conveyor-dryer vapor outlet to said condenser vapor inlet, the vapor being condensed to liquid in said condenser;

a separator having an inlet connected to receive liquid from said condenser liquid outlet, a water outlet, and a solvent outlet, the water and sovent liquids being separated in the separator for separate discharge; and a dry slude receptacle having closed communication with said conveyor-dryer solids discharge outlet for receiving the solids extracted from the contaminated solvent.

2. The system according to claim 1 wherein said conveyor-dryer is of the rotating screw type.

3. The system according to claim 1 wherein the apparatus making up the system is mounted on a portable base structure.

4. The system according to claim 1 wherein said separator includes coalescing means.

5. The system according to claim 1 including a heater-vaporizer means for heating a heat transfer liquid and wherein said cyclonic still and said conveyor-dryer are heated by heat transfer liquid.

6. The system according to claim 1 including cyclonic producing steam injection means with said cyclonic still to augment the cyclonic action of contaminated solvent injected into the still.

7. The system according to claim 1 including means to maintain the interior of said cyclonic still and said conveyor-dryer under sub-atmospheric pressure.

8. The system according to claim 7 in which said dry sludge receptacle has closed communication with said conveyor-dryer and in which the sludge receptacle is also maintained at sub-atmospheric pressures.

9. The system according to claim 5 in which said heater-vaporizer means for heating a heat transfer liquid includes integral means heating water to produce steam for use in the system.

10. The system according to claim 1 in which said heated cyclonic still and said conveyor-dryer are formed as a closed, unitary apparatus.

11. The system according to claim 1 including a valve means in said conveyor-dryer solids discharge outlet whereby a filled dry sludge receptacle may be replaced by an empty dry sludge receptacle while maintaining the interior of said cyclonic still and said conveyor-dryer at sub-atmospheric pressures.

* * * * *